United States Patent
Demianovich et al.

(10) Patent No.: US 10,196,199 B2
(45) Date of Patent: Feb. 5, 2019

(54) CONVERTIBLE SUPPORT STRUCTURES FOR SHIPPING LARGE MACHINERY

(71) Applicant: General Electric Company, Schenectady, NY (US)

(72) Inventors: Nicholas Demianovich, Greenville, SC (US); Dinesh Venugopal Setty, Karnataka (IN); Jeffrey Patrick Mills, Greenville, SC (US); Likhith Reddy Asani, Karnataka (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 56 days.

(21) Appl. No.: 15/169,974

(22) Filed: Jun. 1, 2016

(65) Prior Publication Data
US 2017/0349368 A1    Dec. 7, 2017

(51) Int. Cl.
| | |
|---|---|
| *B65D 85/68* | (2006.01) |
| *B65D 90/00* | (2006.01) |
| *F16M 5/00* | (2006.01) |
| *B60P 3/035* | (2006.01) |
| *B60P 7/12* | (2006.01) |

(52) U.S. Cl.
CPC .............. *B65D 85/68* (2013.01); *B60P 3/035* (2013.01); *B60P 7/12* (2013.01); *B65D 90/004* (2013.01); *F16M 5/00* (2013.01); *B65D 2585/6877* (2013.01)

(58) Field of Classification Search
USPC ................ 248/637, 657, 671, 672, 676, 678
See application file for complete search history.

(56) References Cited

U.S. PATENT DOCUMENTS

| | | | | |
|---|---|---|---|---|
| 4,660,796 A | * | 4/1987 | Garrec | B65D 85/68 108/55.1 |
| 4,735,310 A | | 4/1988 | Lemery et al. | |
| 5,816,367 A | * | 10/1998 | Lilja | F01D 25/285 187/244 |
| 6,000,903 A | | 12/1999 | Hatch et al. | |
| 6,170,141 B1 | * | 1/2001 | Rossway | F01D 25/285 206/319 |
| 6,793,458 B2 | | 9/2004 | Kawai et al. | |

(Continued)

FOREIGN PATENT DOCUMENTS

WO    2015/022350 A1    2/2015

OTHER PUBLICATIONS

Extended European Search Report and Written Opinion issued in connection with corresponding EP Application No. 17172572.4 dated Oct. 24, 2017.

*Primary Examiner* — Alfred J Wujciak
(74) *Attorney, Agent, or Firm* — Nixon & Vanderhye P.C.

(57) ABSTRACT

A progressive shipping stand includes a stage one assembly, and a stage two assembly. The stage one assembly and the stage two assembly together define a first profile, and the stage two assembly alone defines a second profile, smaller than the first profile. The stage two assembly may be attachable directly to a load. The stage two assembly is operable independently in a discrete support configuration and is selectively cooperable with the stage one assembly in a full support configuration. The shipping support allows for large machinery such as a turbine or the like to meet at least one shipping criteria that would not otherwise be feasible using a standard shipping support.

4 Claims, 5 Drawing Sheets

(56) References Cited

U.S. PATENT DOCUMENTS

| | | | |
|---|---|---|---|
| 7,311,338 B2* | 12/2007 | Osterloh | B01L 9/00 |
| | | | 248/648 |
| 7,810,799 B2* | 10/2010 | McGloghlon | B25H 1/0007 |
| | | | 248/676 |
| 7,963,542 B2 | 6/2011 | Doll et al. | |
| 8,876,448 B1 | 11/2014 | Hess et al. | |
| 2009/0072564 A1 | 3/2009 | Teeple | |
| 2012/0224944 A1 | 9/2012 | Boulanger et al. | |
| 2014/0013768 A1* | 1/2014 | Laing | F02C 7/20 |
| | | | 60/796 |
| 2015/0176751 A1* | 6/2015 | Spratt | F16M 5/00 |
| | | | 290/1 A |

* cited by examiner

CONVERTIBLE SUPPORT STRUCTURES FOR SHIPPING LARGE MACHINERY

BACKGROUND OF THE INVENTION

The invention relates to shipping support structure for large machinery and, more particularly, to a shipping support structure that allows for large machinery such as a turbine or the like to meet at least one shipping criteria that would not otherwise be feasible using a standard shipping support.

Advances in turbine technology have pushed turbine sizes larger. Turbine and other large machinery manufacturers ship product all over the world using every means of transport. Existing infrastructure, however, is not easily modified to accommodate the larger sized machines, resulting in difficulties in delivering product to final destinations. As such, when shipping large machinery such as heavy duty gas turbines, challenges arise to accommodate normal global shipping limits including height, width and weight limitations.

Currently, to enable shipment of these products to challenging locations, special and time-consuming circuitous routes or costly work-arounds are required. Often, the route is limited by one obstacle that presents the challenge, for example a low bridge or narrow passage. Existing methods for overcoming shipping envelope limits include adjustable rail cars or road vehicles that move laterally and vertically. Alternative route planning is also available to avoid constraining obstacles. These options, however, are not preferable because there are not many options for adjustable vessels, and these vessels also have limits. These options are also expensive to utilize. A single configuration shipping support could be designed to meet the most challenging obstacle on a route without being configurable; however, this solution would compromise other requirements or be higher in cost.

It would be desirable to overcome these drawbacks and enable heavy machinery to be shipped in the most economical route with minimal delay.

BRIEF SUMMARY OF THE INVENTION

In an exemplary embodiment, a shipping stand for large machinery includes a primary support structure with first components that are configured to support the large machinery during a shipping operation, and a secondary support structure attachable to the large machinery and cooperative with the primary support structure. The secondary support structure includes second components that are configured to support the large machinery during the shipping operation. The shipping stand is selectively configurable between a full support configuration using both the primary support structure and the secondary support structure and a discrete support configuration using only the secondary support structure. At least one physical characteristic of the shipping stand is varied between the full support configuration and the discrete support configuration.

In another exemplary embodiment, a progressive shipping stand includes a stage one assembly, and a stage two assembly, where the stage one assembly and the stage two assembly together define a first profile, and where the stage two assembly alone defines a second profile, smaller than the first profile. The stage two assembly is attachable directly to a load. The stage two assembly is operable independently in a discrete support configuration and is selectively cooperable with the stage one assembly in a full support configuration.

In yet another exemplary embodiment, a method of shipping large machinery using a shipping stand includes the steps of positioning the large machinery and the secondary support structure on the primary support structure; and before or during shipping, modifying at least one physical characteristic of the shipping stand by removing the primary support structure such that the large machinery is supported only on the secondary support structure.

DETAILED DESCRIPTION OF THE INVENTION

With reference to the drawings, embodiments of the invention relate to a shipping support structure comprised of at least two configurations, where a primary support structure is used for a majority of shipping transport modes, while a secondary support structure is selectively used in a restricted or challenging mode or segment. In some embodiments, the primary support structure and the secondary support structure are used together in a full support configuration. The primary support structure can be removed, leaving the secondary support structure to support the machinery in a discrete support configuration. The discrete support configuration can reduce the overall shipping height by several inches, enabling passage under a height constraint obstacle. In other embodiments, special configurations could temporarily reduce the width or weight of the overall shipment as well.

The primary support structure may be referred to as a stage one assembly, and the secondary support structure may be referred to as a stage two assembly. The stage one assembly and the stage two assembly together define a first profile, and the stage two assembly alone defines a second profile, smaller than the first profile. In some embodiments, the stage two assembly is attachable directly to a load and is operable independently in the discrete support configuration. The stage two assembly is selectively cooperable with the stage one assembly in the full support configuration.

Figure 1:
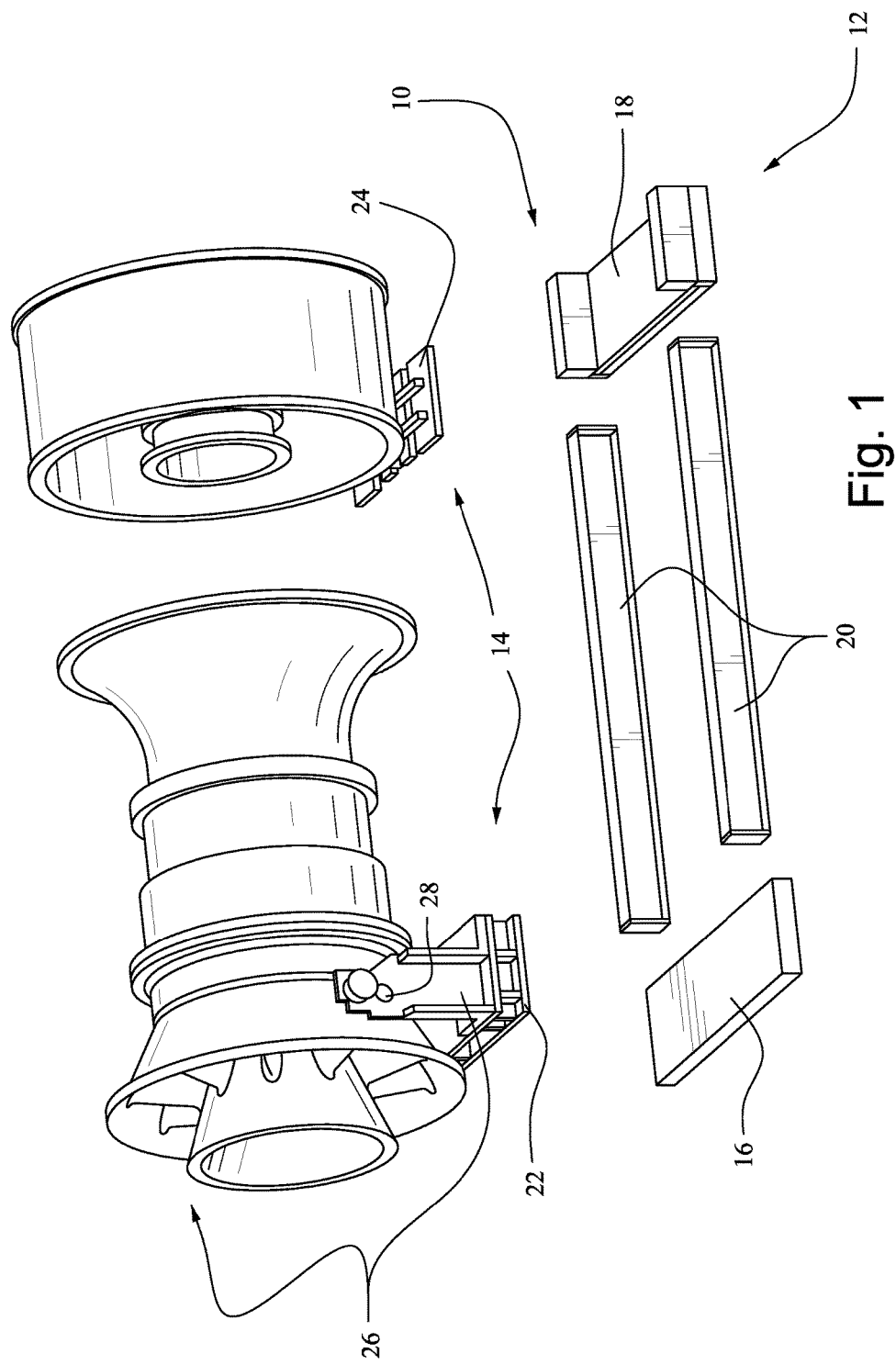
FIG. 1 is a perspective view of the shipping stand according to the described embodiments.

With reference to FIG. 1, a shipping stand 10 is shown supporting a gas turbine, which is exemplary. The shipping stand 10 includes a primary support structure 12 including first components that are configured to support the large machinery during the shipping operation. A secondary support structure 14 is attachable to the large machinery and is cooperative with the primary support structure 12. The secondary support structure 14 includes second components that are similarly configured to support the large machinery during the shipping operation. Generally, the shipping stand 10 is selectively configurable between a full support configuration using both the primary support structure 12 and the secondary support structure 14 and a discrete support configuration using only the secondary support structure 14. At least one physical characteristic of the shipping stand, e.g., height, width, weight, is varied between the full support configuration and the discrete support configuration.

In some embodiments, the primary support structure 12 includes a front end base member 16, a rear end base member 18, and supporting rails 20 disposed between the front end base 16 and the rear end base 18. The rear end base 18 is shown in FIG. 1 with rails, which are exemplary. The secondary support structure 14 may include a bracket support base 22 and a gib plate 24. In the full support configuration, the bracket support base 22 is positioned on the front end base member 16 of the primary support structure 12 and the gib plate 24 is positioned on the rear end base 18. As such, the secondary support structure 14 is received by the primary support structure 12 in the full support configuration.

The stand may additionally include a pair of stand legs 26 (one shown in FIG. 1 with a second stand leg on an opposite side of the turbine). The stand legs 26 are attached to the bracket support base 22 and are each respectively positioned to receive a pin, such as a turbine casing pin 28, affixed to the machinery.

Figure 2:
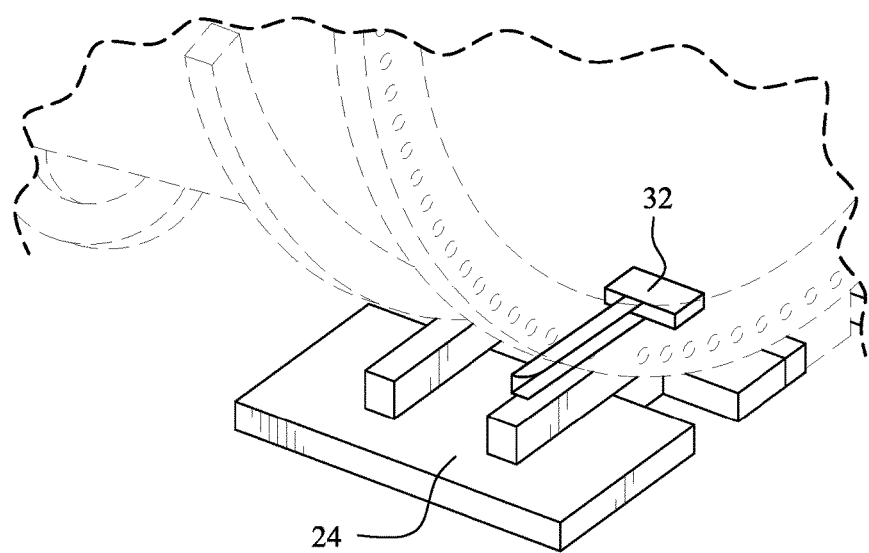
FIG. 2 is a detail view showing a component connecting a portion of the stand to the machinery load.

With reference to FIG. 2, in some embodiments, a connecting key 32 is attachable to the gib plate 24 and to a pocket machined into the machinery. The connecting key 32 along with the stand legs 26 provide a three-point support configuration for shipping.

Figure 3:
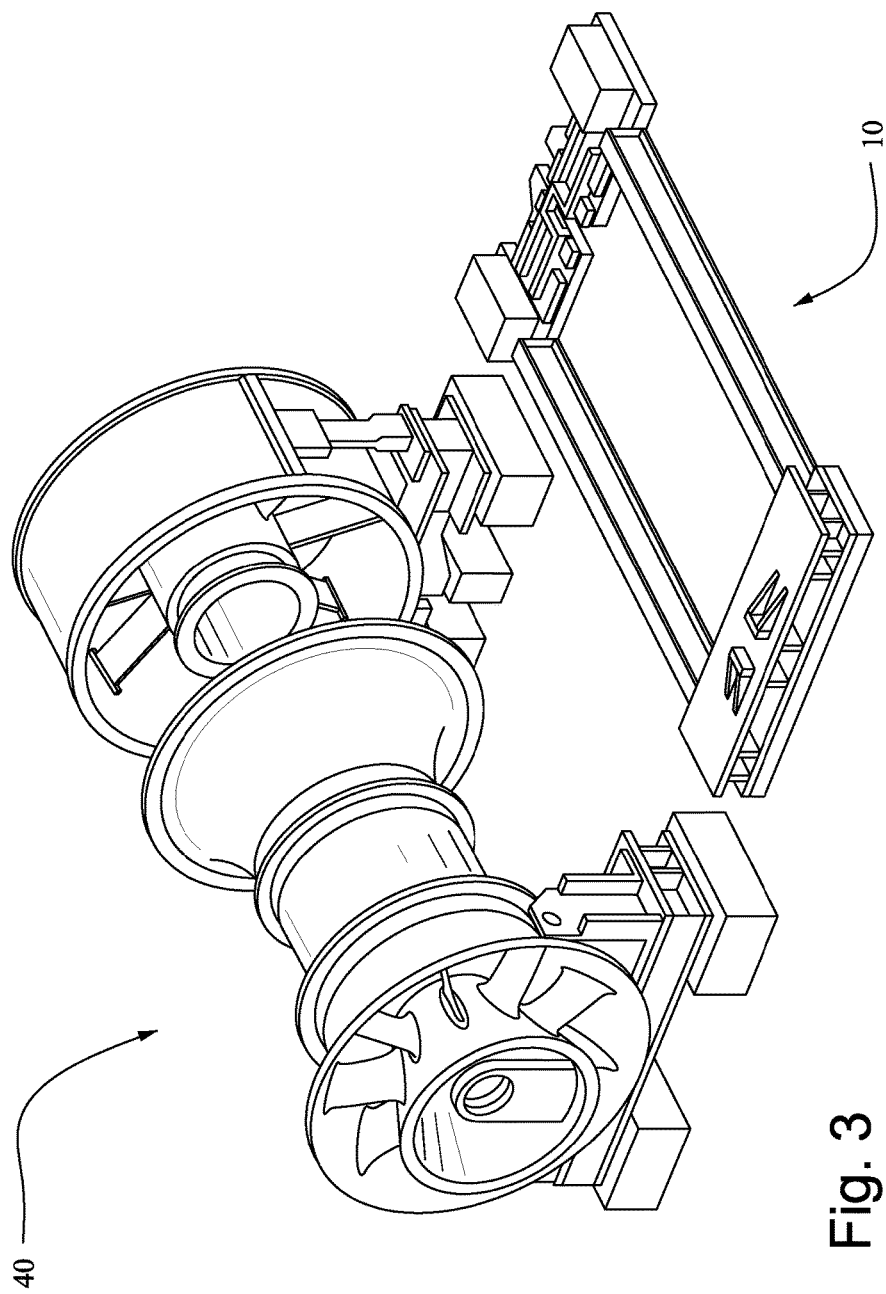
FIGS. 3-5 show a gas turbine utilizing the progressive shipping stand of the described embodiments during a shipping operation.
Figure 4:
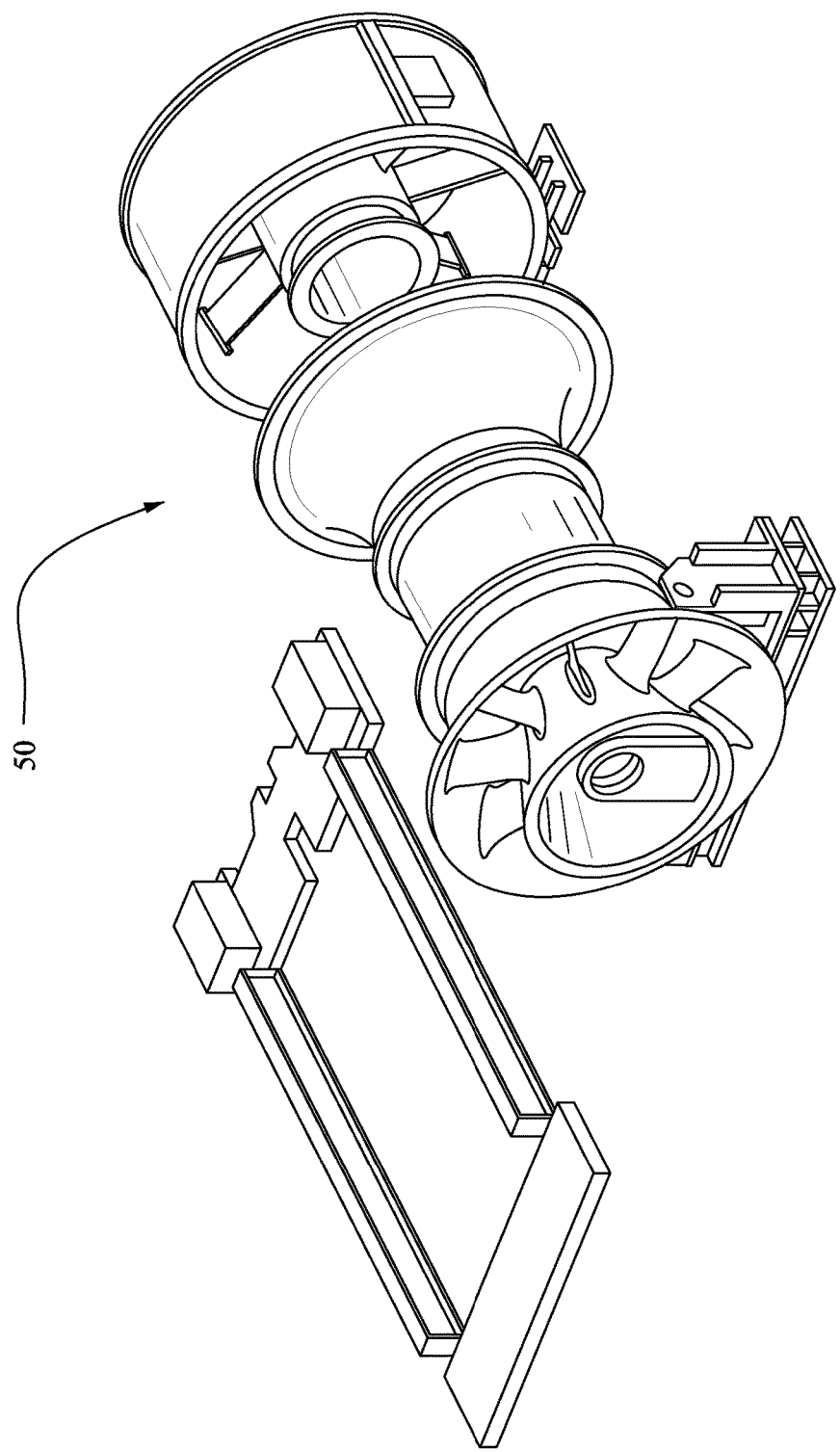
Figure 5:
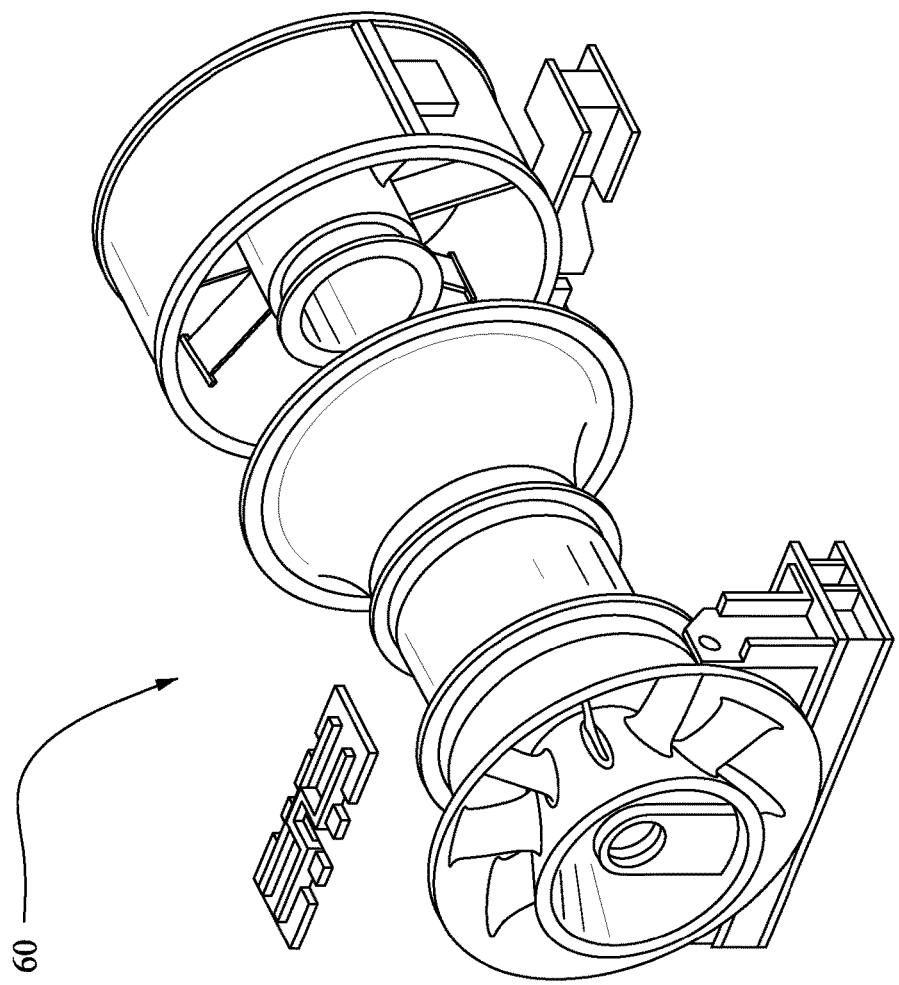

FIGS. 3-5 show a method of shipping large machinery such as a gas turbine using the shipping stand 10 of the described embodiments. As noted, the shipping stand 10 includes the primary support structure 12 and the secondary support structure 14. At a manufacturing site 40, for example, when the machinery is being prepared for shipping, the machinery and the secondary support structure are positioned on the primary support structure in the full support configuration. Before or during shipping 50, at least one physical characteristic of the shipping stand can be modified by removing the primary support structure such that the large machinery is supported only on the secondary support structure in the discrete support configuration. In the discrete support configuration, a physical characteristic of the shipping stand such as stand height can be significantly reduced. If necessary, the stand can be configured into the discrete support configuration for a short period of time, for example, to temporarily reduce a height of the shipment to accommodate a low bridge or the like. In the discrete support configuration, additional shipping limitations may apply such as speed limitations. Once the obstacle has been cleared, the modified physical characteristic may be unmodified by replacing the primary support structure such that the machinery is then supported by both the primary support structure and the secondary support structure in the full support configuration for the remainder of the transport or until incurring another obstacle. At its final destination 60, the machine is installed onto an operating platform or the like.

The progressive shipping stand of the described embodiments enables heavy machinery to be shipped through challenging routes and frees continued technology development for size increases without shipping limitations. The shipping stand enables shorter and quicker shipments for heavy machinery, thereby reducing shipping costs. The stand allows for more options for shipping routes and enables more destinations to be achieved economically.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A shipping stand for large machinery, the shipping stand comprising:
   a primary support structure including first components that are configured to support the large machinery during a shipping operation;
   a secondary support structure attachable to the large machinery and cooperative with the primary support structure, the secondary support structure including second components that are configured to support the large machinery during the shipping operation,
   wherein the shipping stand is selectively configurable between a full support configuration using both the primary support structure and the secondary support structure and a discrete support configuration using only the secondary support structure such that the primary support structure forms no part of the shipping stand configuration in the discrete support configuration, and wherein at least one physical characteristic of the shipping stand is varied between the full support configuration and the discrete support configuration,
   wherein in the full support configuration, the secondary support structure is received by the primary support structure, wherein the primary support structure comprises a front end base member, a rear end base, and supporting rails disposed between the front end base member and the rear end base, wherein the secondary support structure comprises bracket support base and a gib plate, and wherein in the full support configuration, the bracket support base is positioned on the front end base member of the primary support structure and the gib plate is positioned on the rear end base;
   a pair of stand legs attached to the bracket support base and each respectively positioned to receive a machinery pin; and
   a connecting key attachable to the gib plate and to a pocket that is machined into the machinery.

2. A shipping stand according to claim 1, wherein a height of the shipping stand is smaller in the discrete shipping configuration than in the full support configuration.

3. A shipping stand according to claim 1, wherein a weight of the shipping stand is smaller in the discrete shipping configuration than in the full support configuration.

4. A shipping stand according to claim 1, wherein a width of the shipping stand is smaller in the discrete shipping configuration than in the full support configuration.

* * * * *